(12) United States Patent
Kompella

(10) Patent No.: US 8,117,301 B2
(45) Date of Patent: Feb. 14, 2012

(54) DETERMINING CONNECTIVITY STATUS FOR UNNUMBERED INTERFACES OF A TARGET NETWORK DEVICE

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1158 days.

(21) Appl. No.: 11/445,508

(22) Filed: Jun. 1, 2006

(65) Prior Publication Data

US 2007/0192501 A1    Aug. 16, 2007

Related U.S. Application Data

(60) Provisional application No. 60/763,237, filed on Jan. 30, 2006.

(51) Int. Cl.
 G06F 15/173   (2006.01)
 G06F 15/16    (2006.01)
(52) U.S. Cl. .......................... 709/224; 709/227
(58) Field of Classification Search .................. 709/227
 See application file for complete search history.

(56) References Cited

U.S. PATENT DOCUMENTS

| | | | |
|---|---|---|---|
| 6,173,411 B1 * | 1/2001 | Hirst et al. ........................ 714/4 |
| 6,507,869 B1 * | 1/2003 | Franke et al. ................. 709/224 |
| 6,618,360 B1 * | 9/2003 | Scoville et al. ............... 370/248 |
| 6,850,253 B1 * | 2/2005 | Bazerman et al. ............ 715/734 |
| 6,982,953 B1 * | 1/2006 | Swales ........................... 370/218 |
| 7,120,693 B2 * | 10/2006 | Chang et al. ................. 709/227 |
| 7,219,030 B2 * | 5/2007 | Ohtani .......................... 702/122 |
| 7,391,719 B2 * | 6/2008 | Ellis et al. ..................... 370/219 |
| 7,471,638 B2 * | 12/2008 | Torrey et al. ................. 370/248 |
| 7,523,185 B1 * | 4/2009 | Ng et al. ........................ 709/223 |
| 7,639,624 B2 * | 12/2009 | McGee et al. ................ 370/248 |
| 7,724,677 B2 * | 5/2010 | Iwami ........................... 370/248 |
| 2005/0259634 A1 * | 11/2005 | Ross ............................. 370/351 |
| 2006/0095538 A1 * | 5/2006 | Rehman et al. .............. 709/217 |
| 2007/0041554 A1 * | 2/2007 | Newman et al. .......... 379/218.01 |

(Continued)

FOREIGN PATENT DOCUMENTS

EP    1 367 750 A1    12/2003

OTHER PUBLICATIONS

A. Atlas, "ICMP Extensions for Unnumbered Interfaces," draft-atlas-icmp-unnumbered-00.txt, Dec. 9, 2005, 8 pgs.

(Continued)

*Primary Examiner* — Minh-Chau Nguyen
(74) *Attorney, Agent, or Firm* — Shumaker & Sieffert, P.A.

(57) ABSTRACT

Techniques are described for testing connectivity to unnumbered interfaces of a target device. For example, a software utility and protocol are described that allows an administrator to specify a logical offset that may be internally resolved by the target device to one of a plurality of unnumbered interfaces during the test. Similarly, the administrator may specify an offset that may be internally resolved by the source device to one of a plurality of unnumbered interfaces from which the connectivity test is to originate. The source device may send enhanced request packets and receive enhanced reply packets specifying the source unnumbered interface and the destination unnumbered interface between which connectivity is to be tested. In this manner, an administrator may test for connectivity of particular interfaces even where internet protocol (IP) addresses or other identifiers for the interfaces are not externally known.

20 Claims, 9 Drawing Sheets

U.S. PATENT DOCUMENTS

| | | | |
|---|---|---|---|
| 2007/0061103 A1* | 3/2007 | Patzschke et al. | 702/182 |
| 2007/0220252 A1* | 9/2007 | Sinko | 713/168 |
| 2009/0019141 A1* | 1/2009 | Bush et al. | 709/223 |

OTHER PUBLICATIONS

A. Atlas, "ICMP Extensions for Unnumbered Interfaces," draft-atlas-icmp-unnumbered-01.txt, Feb. 2006, 8 pgs.

Notification of the Second Office Action dated Dec. 5, 2008, for corresponding Chinese Patent Application No. 200710002765.9, 12 pgs.

European Search Report dated Jan. 28, 2008, for corresponding European Application No. 07250251.1, 9 pgs.

R. Bonica et al., "Generic Tunnel Tracing Protocol (GTTP) Specification," IETF Standard-Working-Draft, Internet Engineering Task Force, Jul. 2001, XP015011025, 20 pgs.

H. Berkowitz, "Router Renumbering Guide," IETF Standard, Internet Engineering Task Force, Jan. 1997, RFC 2072, XP015007856, 41 pgs.

E. Mannie—Editor, "Generalized Multi-Protocol Label Switching Architecture," IETF Standard-Working-Draft, Internet Engineering Task Force, May 2003, XP015001499, 56 pgs.

K. Kompella, "Signalling Unnumbered Links in Resource ReSerVation Protocol—Traffic Engineering (RSVP-TE)," IETF Standard-Working-Draft, Internet Engineering Task Force, Jan. 2003, RFC 3477, XP015009260, 8 pgs.

Notification of the First Office Action dated May 9, 2008, for corresponding Chinese Patent Application No. 200710002765.9, 10 pgs.

Sun Hai-feng, "Advanced TCP Port Scan and Its Response," O.I. Automation 2005, vol. 24, No. 4, Apr. 24, 2005, China Academic Electronic Publishing House, http://www.cnki.net, 2 pgs., Abstract only.

Zvon—RFC 2072 [Router Renumbering Guide]—Router Identifiers, Chapter 8.3 Unnumbered Interfaces, www.zvon.org/tmRFC/RFC2072/Output/chapter8.html, last printed Nov. 7, 2005, 2 pgs.

"ICMP (Internet Control Message Protocol)," Data Network Resource, www.rhyshaden.com/icmp.html, last printed Nov. 10, 2005, 4 pgs.

"Using the IP unnumbered configuration FAQ," APNIC, www.apnic.net/info/faq/ip_unnumb.html, Jul. 1, 2005, 2 pgs.

"Traceroute," Webopedia, www.webopedia.com/TERM/t/traceroute.html, Aug. 26, 2004, 1 pg.

"RFC 2151—(rfc2151)—A Primer on Internet and TCP/IP Tools and Utilities," www.rfcsearch.org/rfcview/RFC/2151.html, last printed Nov. 9, 2005, 3 pgs.

Gorry Fairhurst, "Internet Control Message Protocol," Internet Control Message Protocol (ICMP), www.erg.abdn.ac.uk/users/gorry/course/inet-pages/icmp.html, last printed Sep. 6, 2006, 3 pgs.

"ActiveXperts PING backgrounds (PING is part of the ActiveSocket Toolkit)," ActiveSocket Network Communication Toolkit 2.4, Activexperts, www.activexperts.com/activsocket/toolkits/ping.html, last printed Nov. 10, 2005, 3 pgs.

Vijay Mukhi et al., "Internet Control Message Protocol ICMP," www.vijaymukhi.com/vmis/icmp, last printed Sep. 6, 2006, 5 pgs.

"Configure the Loopback Interface," www.juniper.net/techpubs/software/junos/junos56/index.html, last printed Nov. 7, 2005, 2 pgs.

"Configure an Unnumbered Interface," www.juniper.net/techpubs/software/junos/junos56/index.html, last printed Nov. 7, 2005, 1 pg.

Notification of the Decision of Rejection dated Sep. 4, 2009, for corresponding Chinese Patent Application No. 200710002765.9, 15 pgs.

* cited by examiner

```
Command Line Interface

Server 12A >tracert -h 7 -w 18 server_12B dst_int=3 src_int=1

Tracing route to server_12B [72.14.203.104] [interface 3] over a
maximum of 7 hops:
                                                   IN    OUT
  1    1 ms      <1 ms      <1 ms   192.168.1.1     *     2
  2    1 ms      156 ms     135 ms  64.122.234.65   3     3
  3    *         171 ms     170 ms  72.11.104.241   5
  4    159 ms    [64.122.32.20]
                 169 ms     169 ms  v12.prlkd51.mn.integraonline.net  1   4
  5    161 ms    169 ms     149 ms  68.178.40.25    2     2
  6    159 ms    [208.51.198.161]
                 *          *       ge-2-3-0.402.ar2.MIN1.glbx.net    3   5
  7    172 ms    169 ms     *       so0-0-0-2488M.ar1.CHI2.glbx.net   3   *
                 [67.17.67.126]

Trace complete.

Server 12A >
```

FIG. 7

DETERMINING CONNECTIVITY STATUS FOR UNNUMBERED INTERFACES OF A TARGET NETWORK DEVICE

This application claims the benefit of U.S. Provisional Application Ser. No. 60/763,237, filed Jan. 30, 2006, the entire content of which is incorporated herein by reference.

TECHNICAL FIELD

The invention relates to computer networks and, more particularly, to software utilities for determining the status of computer network connections.

BACKGROUND

Conventional software utilities, such as the commonly used ping and traceroute utilities, are useful tools for identifying failed connectivity between two nodes of a network. These tools typically require a user to enter a unique identifier, such as a particular internet protocol (IP) address, of a remote host in order to test the connectivity to that remote host. For example, the ping protocol tests connectivity to a remote host by sending an Internet Control Message Protocol (ICMP) echo request packet to a specific IP address to test the status of connectivity to a particular target device having the IP address. If an echo reply packet is not received within a defined time period, connectivity to that device is assumed to be down.

Similarly, the traceroute protocol requires an IP address for a target device in order to test connectivity from the source device to that target device. The traceroute utility tests connectivity to the remote target device by tracing an ICMP echo request packet's path from the source device to the particular IP address specified by the user. As output, the traceroute typically shows how many hops the packet traveled to reach the IP address, identifies each hop by its IP address, and shows how long each hop took.

If the target device incorporates multiple network interfaces and those separate IP addresses have been assigned to the interfaces, then a network administrator may test the connectivity from a source device to a particular one of the interfaces using the conventional software utilities. For example, by inputting the IP address of the particular interface of interest, an administrator may direct ping or traceroute to that interface of the target device. This may be useful in many scenarios, such as when multiple paths exist between the source device and target device.

However, assignment of external, known IP addresses to each individual network interface may be undesirable for many reasons. For example, assigning known IP addresses to each individual interface exposes the device to interface-specific network attacks, such as packet-flooding of a particular interface. Furthermore, assigning and managing individual IP addresses for each interface of each network device within a network may increase operational expenses.

For these reasons, network administrators may elect to forego assignment of an individual publicly known identifier, such as an IP address, to each network interface. From an external view, each interface is, in effect, an unnumbered network interface. Although this approach avoids the security risks and operational expenses associated with assignment of IP address to each interface, the network administrators are unable to use conventional connectivity testing utilities, such as ping and traceroute, to test the connectivity on an interface-by-interface basis.

SUMMARY

In general, principles of the invention relate techniques and protocols for extending network connectivity software utilities, such as ping and traceroute, to support unnumbered interfaces. More specifically, in accordance with the principles described herein, the software utilities allow connectivity tests to be performed for individual network interfaces of a target device even though the device has been configured with unnumbered network interfaces. In this way, even when interfaces of a remote target device have not been assigned a known unique identifier, such as a dedicated internet protocol (IP) address, an administrator may still use the software utilities to test the interfaces for connectivity.

As one example, the techniques described herein may be used to extend the conventional ping protocol to support unnumbered interfaces. An administrator may use the extended ping protocol to test connectivity from a source device to each of a plurality of unnumbered interfaces of a target device on an interface-by-interface basis. The extended ping protocol may include additional fields that allow the administrator to specify an unnumbered interface of a source device, an unnumbered interface of a target device, or both, using one or more index numbers. The source device may then send enhanced ping request packets and receive enhanced ping reply packets that include additional fields specifying the source interface and destination interface being tested.

As another example, the techniques described herein may be used to extend the conventional traceroute protocol. The administrator may use the extended traceroute protocol to trace a route between a particular unnumbered interface of a source device and a particular unnumbered interface of a target device, or combinations thereof. The source device may send enhanced traceroute request packets and receive enhanced traceroute reply packets that include additional fields specifying the source interface and destination interface being tested, as well as interfaces of intermediate devices located along the route between the source interface and the destination interface.

In this manner, the administrator may more quickly locate a network connectivity error by selectively testing connectivity to specific interfaces of target device or along a route between devices even where the tested interfaces are unnumbered.

In one embodiment, a method comprises executing a software utility on a source device and presenting with the software utility a user interface to receive input from a user at a source device. The input identifies a target device and an offset, and the offset represents an index into one of a plurality of unnumbered interfaces associated with the target device. The method further comprises outputting from the source device with the software utility one or more packets to test connectivity from the source device to one of the plurality of unnumbered interfaces of the target device. At least one of the packets specifies the offset and communicates the offset from the source device to the target device to request a connectivity test.

In another embodiment, a method comprises receiving from a source device a request packet to initiate a connectivity test at a target device, wherein the request packet includes a field specifying an offset, and resolving the offset to one of the plurality of unnumbered interfaces of the target device to select a target unnumbered interface for which the connectivity test is requested. The method further comprises outputting to the source device a reply packet from the selected target unnumbered interface of the target device to test connectivity between the target unnumbered interface and the source device.

In yet another embodiment, a source network device comprises a software utility executing on the device that presents a user interface to receive input from a user, wherein the input identifies a target device and an offset that represents an index into one of a plurality of unnumbered interfaces associated with the target device. The software utility outputs from the source device one or more packets to test connectivity from the source device to one of the plurality of unnumbered interfaces on the target device.

In another embodiment, a system comprises a source device that outputs a request packet to initiate a connectivity test at a target device, wherein the request packet includes a field specifying an offset. The system further includes a target device that resolves the offset to one of a plurality of unnumbered interfaces of the target device to select a target unnumbered interface for which the connectivity test is requested. The target device also outputs to the source device a reply packet from the selected target unnumbered interface of the target device to test connectivity between the target unnumbered interface and the source device.

In another embodiment, a computer-readable medium comprises instructions for causing a programmable processor to execute a software utility on a source device, and present with the software utility a user interface to receive input from a user at a source device. The input identifies a target device and an offset, and the offset represents an index into one of a plurality of unnumbered interfaces associated with the target device. The instructions further cause the programmable processor to output from the source device with the software utility one or more packets to test connectivity from the source device to one of the plurality of unnumbered interfaces of the target device. At least one of the packets specifies the offset and communicates the offset from the source device to the target device to request a connectivity test.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7 is an exemplary screen illustration depicting an example output from an extended traceroute utility.

DETAILED DESCRIPTION

Figure 1:
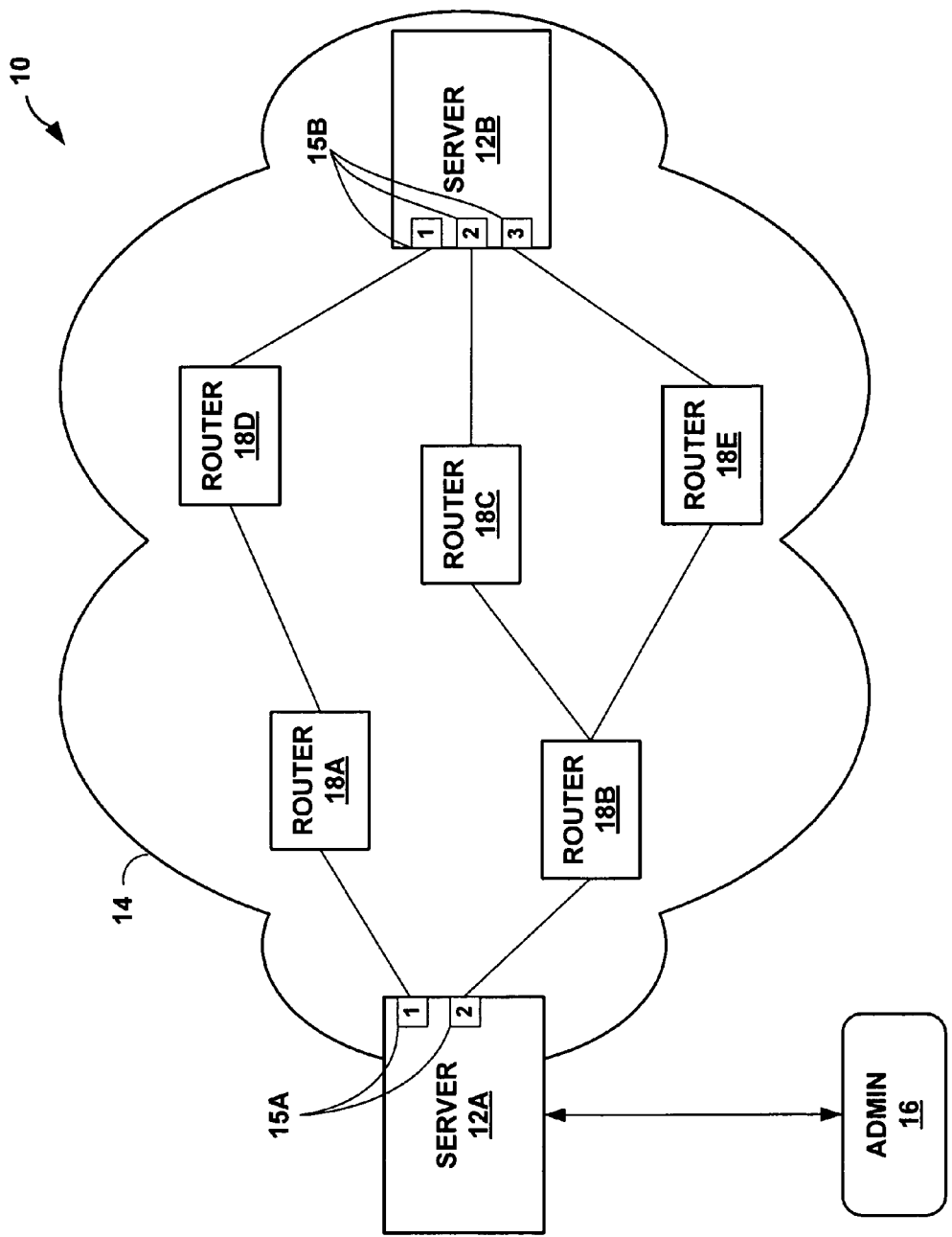
FIG. 1 is a block diagram illustrating an exemplary computer network in which an administrator utilizes a software utility to test connectivity to specific target device interfaces consistent with the principles of the invention.

FIG. 1 is a block diagram illustrating an exemplary network environment 10 in which an administrator 16 (ADMIN) uses a software utility to test server interfaces 15A-15B (collectively, interfaces 15) for connectivity. In particular, administrator 16 utilizes a diagnostic software utility to test connectivity of interfaces 15, even though interfaces 15 are "unnumbered interfaces." As used herein, unnumbered interfaces are network interfaces having no externally known identifier, i.e., an identifier known external to the device, such as an Internet Protocol (IP) address. In this example, network environment 10 includes servers 12A and 12B connected across network 14 via routers 18A-18E (collectively, routers 18). In the example of FIG. 1, servers 12A-12B (collectively, servers 12) support use of a diagnostic software utility, such as a ping protocol or a traceroute protocol, that has been extended to test connectivity of unnumbered interfaces.

Administrator 16 accesses a source device (e.g., server 12A) and invokes the diagnostic software utility to initiate a connectivity test with respect to a target device (e.g., server 12B). During this process, administrator may specify a specific source interface 15A of server 12A, a particular interface 15B of server 12B, or both, between which connectivity is to be tested. In this example, the Internet Control Message Protocol (ICMP) has been extended to support testing connectivity of the unnumbered interfaces 15, and ICMP packets between server 12A and 12B include additional fields that contain the specified interfaces. For example, administrator 16 may request server 12A to "ping" server 12B, with ping request packets being sent along a specific path of router 18A and router 18D. To make this request, administrator 16 specifies that the ping request packets be sent from server 12A, interface 15A-1, to server 12B, interface 15B-1.

Network 14 may comprise any public or private network or the Internet. Routers 18 maintain routing information that describes available routes through network 14. Upon receiving an incoming packet, the routers examine information within the packet and forward the packet in accordance with the routing information. In order to maintain an accurate representation of network 14, the routers exchange routing information, e.g., bandwidth availability of links, in accordance with a defined routing protocol, such as an Interior Gateway Protocol (IGP), OSPF, IS-IS or RIP.

In some embodiments, the software utility is extended in a manner in which the additional fields are opaque to the intermediate routing devices as well as the target device being tested. In these embodiments, when a target device does not support the extension, the target device replies in a conventional fashion. Moreover, although described by way of example to ping and traceroute, the techniques may be applied to extend other network software utilities for diagnosing network conditions with respect to unnumbered interfaces. Moreover, the techniques need not necessarily be applied to extend an existing, conventional protocol. Rather, the techniques may be incorporated in a new diagnostic utility.

Figure 2:
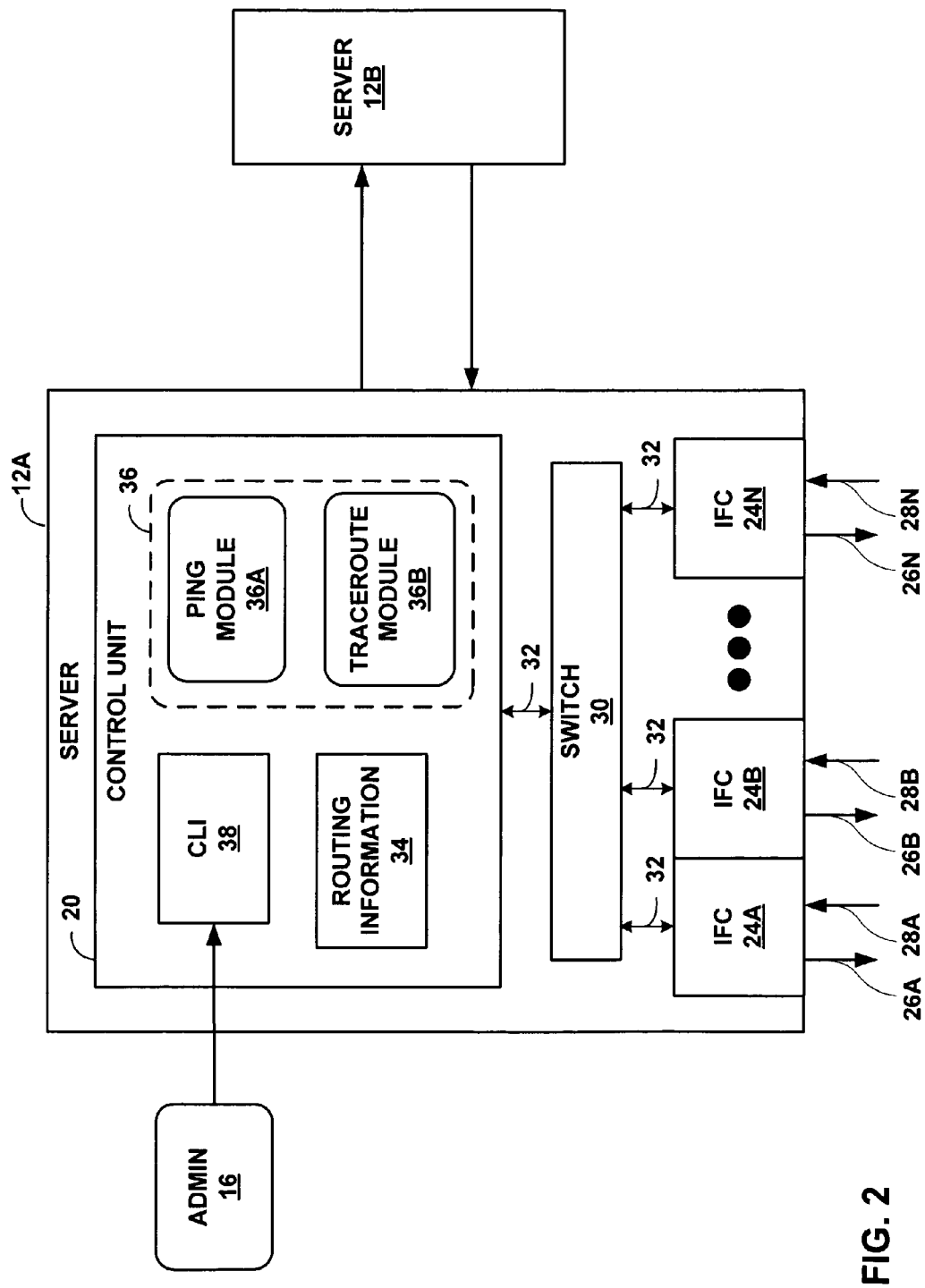
FIG. 2 is a block diagram illustrating an example embodiment of a network device that allows an administrator to perform connectivity testing of unnumbered interfaces consistent with the principles of the invention.

FIG. 2 is a block diagram illustrating an example embodiment of a network device, such as server 12A, that allows administrator 16 to perform connectivity testing of unnumbered interfaces consistent with the principles of the invention. In the example embodiment, server 12A includes interface cards 24A-24N (collectively, "IFCs 24") that send and receive packet flows via inbound network links 26A-26N (collectively, "inbound network links 26") and outbound network links 28A-28N (collectively, "outbound network links 28"), respectively. IFCs 24 are interconnected by a high-speed switch 30 and links 32. In one example, switch 30 comprises switch fabric, switchgear, a configurable network switch or hub, and the like. Links 32 comprise any form of communication path, such as electrical paths within an integrated circuit, external data busses, optical links, network connections, wireless connections, or other type of communication path. IFCs 24 are coupled to network links 26, 28 via a number of interface ports (not shown).

Server 12A includes a control unit 20 that maintains routing information 34 that describes the topology of network 14. Control unit 20 analyzes stored routing information 34 and generates forwarding information (not shown) for forwarding packets received via inbound links 26 to next hops.

Control unit 20 includes one or more diagnostic protocols 36, e.g., ping module 36A and traceroute module 36B. Diagnostic protocols 36 allow server 12A to output enhanced request packets, and receive enhanced reply packets, consistent with the principles of the invention. Diagnostic protocols 36 present interfaces, e.g., a command line interface (CLI) 38 or graphical user interfaces (GUIs), to receive commands from administrator 16 and display results or other messages. Server 12B may be substantially similar to server 12A, or may be a different device. Diagnostic utility protocol modules on server 12B (not shown) allow server 12B to reply in an enhanced fashion to requests from server 12A, thereby allowing administrator 16 to test unnumbered interfaces of servers 12 for connectivity. Although described for exemplary purposes with respect to servers, the source device or the target device may be any form of network device, and either or both of the devices may have one or more unnumbered interfaces. Examples of other devices include intrusion detection devices, virtual private network (VPN) appliances, routers, hubs, switches, gateways, firewalls, security devices and other network devices and appliances.

Figure 3:
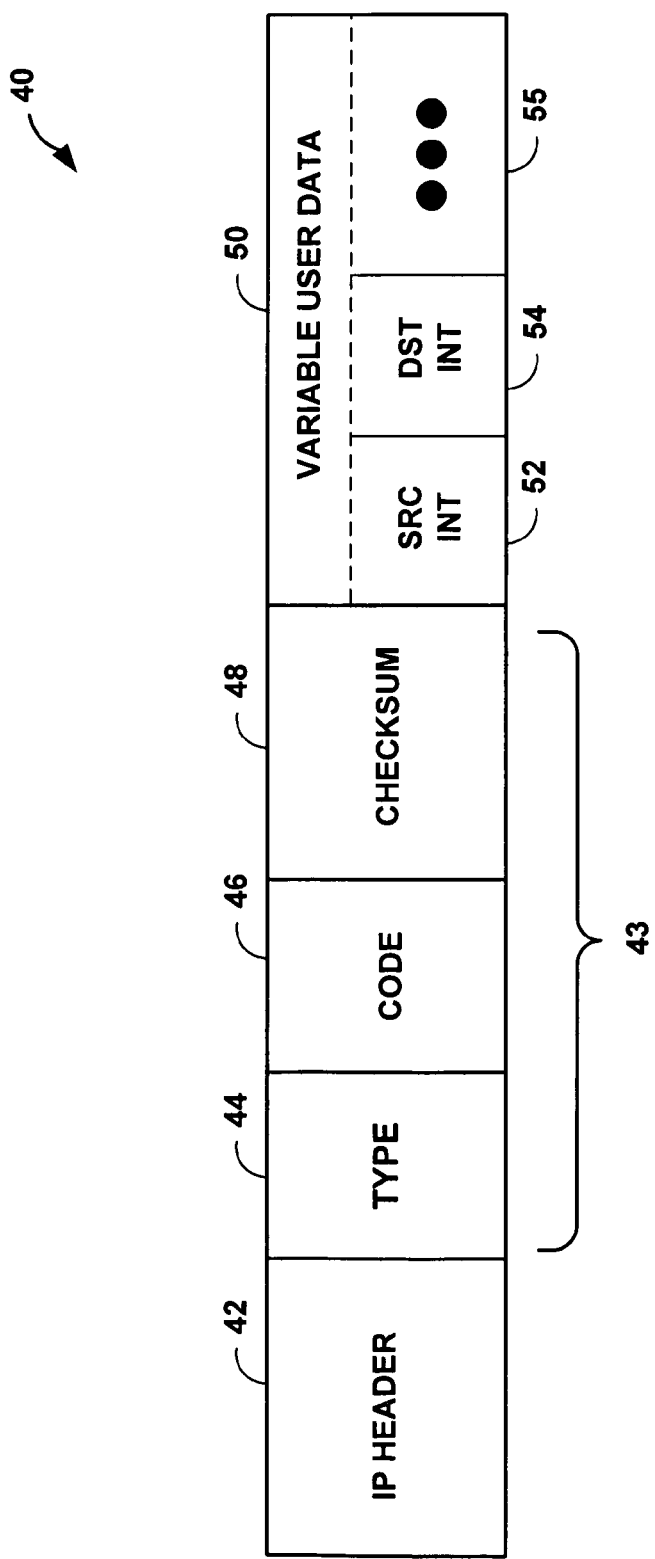
FIG. 3 is a block diagram illustrating an exemplary packet format for use in testing connectivity of unnumbered interfaces.

FIG. 3 is a block diagram illustrating an exemplary format of a packet 40 for use in testing connectivity of specific unnumbered interfaces. Packet 40 may, for example, be an ICMP packet that has been extended to include additional fields. Packet 40 may be a ping echo request, a traceroute echo request, a ping echo reply, a traceroute time exceeded reply, or other type of extended ICMP packet. Packet 40 includes an IP header 42 that contains destination information for purposes of routing. For example, IP header 42 may contain a source IP address, a destination IP address, and a Time to Live (TTL) value that indicates a maximum number of hops the packet can traverse on the way to the packet's destination prior to expiration.

In addition, packet 40 includes an ICMP header 43 having a type field 44, a code field 46, and a checksum 48. Type field 44 is used to identify the type of message. For example, a type value of "8" indicates that the packet is an echo request. This type of packet is used by both the ping and traceroute utilities. A type value of "0" indicates that the packet is an echo reply. Code field 46 varies depending on the particular type of message, as specified by type field 44. For example, for a traceroute reply packet having type 11 ("time exceeded"), a code value of "0" indicates that the time to live expired while the packet was in transit. Checksum 48 may be calculated taking into account the entire ICMP packet.

Variable user data field 50 may contain a variety of optional data entered by administrator 16 via CLI 38. Variable user data field 50 is extended to include source interface ("SRC INT") field 52 and destination interface ("DST INT") field 54. For example, administrator 16 may enter a source interface into source interface field 52, or may enter a destination interface into destination interface field 54, in order to check connectivity of a particular interface of the source device or target device. Administrator 16 may also enter additional data into additional data field 55, such as a number of echo requests to send, the buffer size, the time in milliseconds to wait for each reply, a maximum number of hops to search for a target, or other user data. Server 12A may automatically include other additional data, such as timestamps for calculating the roundtrip time of the packet, and sequence numbers for matching the request packet with a corresponding reply packet.

Figure 4:
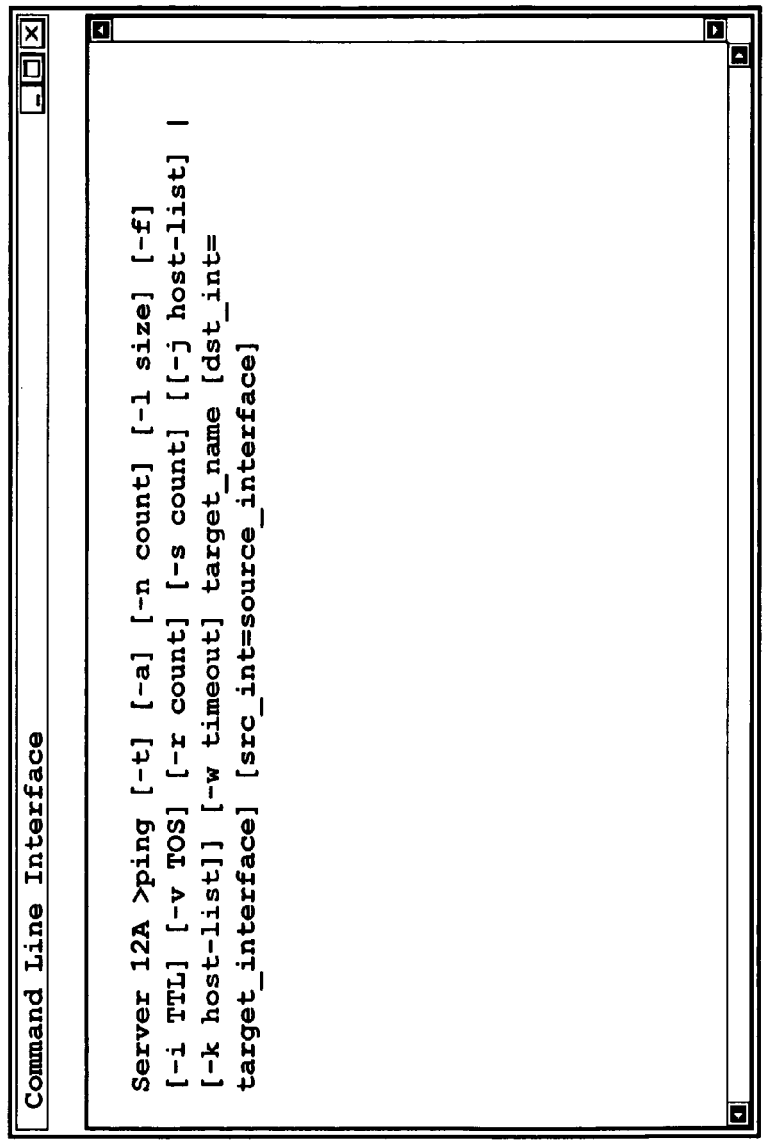
FIG. 4 is an exemplary screen illustration depicting an example command line interface as viewed on a server.

FIG. 4 is an exemplary screen illustration depicting an example command line interface 56 as viewed on a server, such as server 12A of FIGS. 1 and 2. Command line interface 56 illustrates an example syntax format 58 for the ping utility in accordance with the principles of the invention. The ping utility allows router 12A to test for connectivity at particular unnumbered interfaces of routers 12A and 12B by sending a series of echo request packets to router 12B that each contain an index number of the specific one of unnumbered interfaces 15B from which router 12B should output a reply packet. If router 12B receives request packets and if the identified one of unnumbered interface 15B is functional, router 12B may send a corresponding series of echo reply packets via the specified unnumbered interface, thereby notifying router 12A that the interface of router 12B is up.

Syntax format 58 includes a number of options for the ping utility, enclosed in brackets. Syntax format 58 is extended to include additional optional parameters that allow an administrator to check connectivity between particular unnumbered interfaces of source and target devices. As illustrated in command line interface 56, syntax format 58 includes option "-t", which allows an administrator to configure the source device to ping the specified host until the administrator tells the ping server to stop. In one embodiment, the administrator may type Control-Break to see statistics and then continue, and may type Control-C to stop the pinging.

Option "-a" tells the server to resolve addresses to hostnames. Optional field "-n" allows administrator 16 to define a number of echo requests to be sent. Optional field "-l" allows administrator 16 to define the size of the send buffer, in bytes. Option "-f" tells the server to set a "Don't Fragment" flag in the packet. Optional field "-i" allows administrator 16 to set a TTL value. Optional field "-v" allows administrator 16 to identify a Type of Service (TOS). Optional field "-r" allows administrator 16 to record a route for count hops. Optional field "-s" allows administrator 16 to require a timestamp for count hops. Optional field "-j" allows administrator 16 to require a loose source route along the host-list, while optional field "-k" allows administrator 16 to require a strict source route along the host-list. Optional field "-w" allows administrator 16 to configure the timeout in milliseconds to wait for each reply.

"Target_name" is a required field, in which administrator 16 inputs a device ID, i.e., the name or IP address of the target device. As illustrated in FIG. 4, the conventional ping syntax format has been extended to include optional fields "dst_int" and "src_int," which allow administrator 16 to define the specific destination interface and the specific source interface to be tested, respectively.

In particular, for each of these optional fields, administrator 16 may specify an index number or other relative identifier for unnumbered interfaces for the respective source or target device. For example, interfaces 15B-1, 15B-2, and 15B-3 may correspond to indices 1, 2, and 3, respectively. Moreover, the particular ordering of the interfaces 15B may not be known external to server 12B. In other words, the logical identifiers of interfaces 15B may be internal to server 12B, such as defined within configuration information for the server, and not generally known to other devices of network 14. The extended ping protocol communicates the indexes, e.g., via fields 52, 54 of packet format 40 (FIG. 3), to the target device for use when generating reply packets. In this manner, administrator 16 may use the extended ping protocol to test for connectivity of particular interfaces of the target device even where IP addresses or other identifiers for the interfaces are not externally known.

Figure 5:
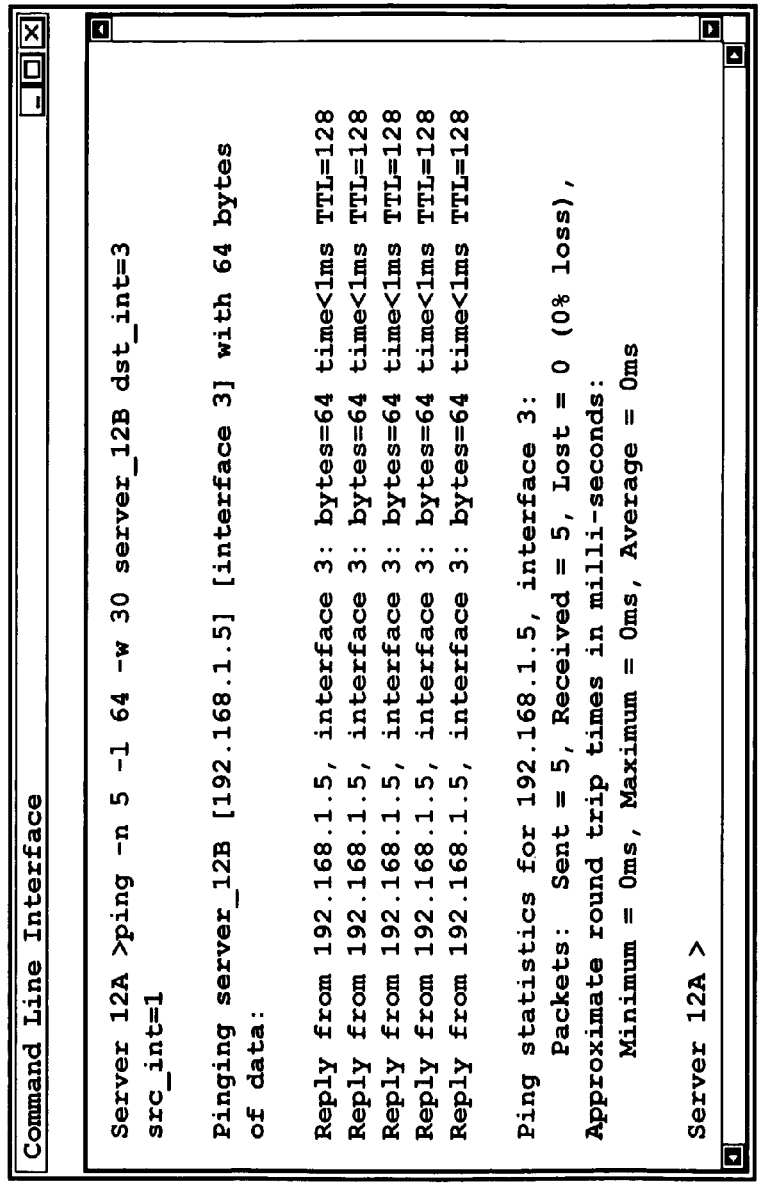
FIG. 5 is an exemplary screen illustration depicting an example output from an extended ping utility.

FIG. 5 is an exemplary screen illustration depicting an example command line interface 60 as viewed on a target device, such as server 12A of FIG. 1. Command line interface 60 shows an example input 62 as entered by administrator 16, and an example output 64 generated by the extended ping module 36A (FIG. 2).

As shown in example input 62, administrator 16 requested the ping utility by entering the command "ping." Administrator 16 customized the ping request using some of the optional fields described above with respect to FIG. 4. For example, administrator 16 used the command "-n 5" to define the number of echo requests to be sent as five, and used the command "-l 64" to define the size of the send buffer as 64 bytes. Administrator 16 used the command "-w 30" to configure the time to wait for each reply as 30 milliseconds. Administrator 16 entered the name of the target device 12B into the "target_name" field, and specified the unnumbered destination interface of server 12B using an index of 3 and source interface of server 12A corresponding to an unnumbered index of 1 using the dst_int and src_int fields. Server 12A and server 12B internally resolve the indexes to interface 15-1 and interface 15A-3, respectively, possibly using internal configuration data known only to administrator 16 and other authorized administrators. In this manner, administrator 16 may require that the echo request packets sent by server 12A are output over interface 1 of server 12A, and that any echo reply packets sent by server 12B are output over interface 3 of server 12B. This way, administrator 16 may test for network connectivity between the specified unnumbered interfaces.

Command line interface 60 also shows an exemplary output 64 generated by ping module 36A. Ping module 36A generated a reply line for each of the five echo request packets that ping module 36A sent. The reply lines state that each reply was received from 192.168.1.5, i.e., the IP address for server 12B, at interface 3 of server 12B. The reply packets each contained 64 bytes of data, and the round-trip time from echo request packet sent to echo reply packet received was less than one millisecond. The Time-to-Live (TTL) value, which indicates a maximum number of hops the packet can traverse on the way to the packet's destination, was 128 hops. Output 64 also includes ping statistics, such as the number of packets sent, received, or lost, the percentage of lost packets, and the minimum, maximum, and average round-trip times.

Figure 6:
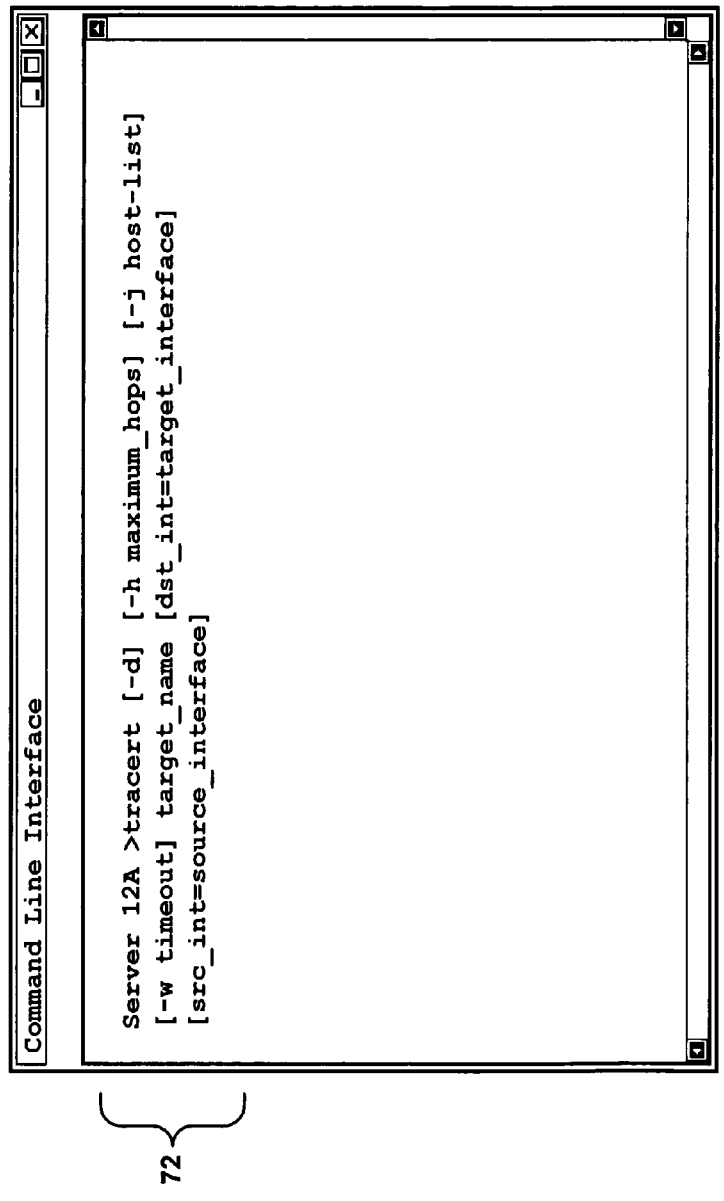
FIG. 6 an exemplary screen illustration depicting another example command line interface as viewed on a server.

FIG. 6 an exemplary screen illustration depicting another example command line interface 70 as viewed on a source device, such as server 12A of FIG. 1. In this example, command line interface 70 illustrates an example syntax format 72 for the traceroute protocol. Syntax format 72 includes a number of options, enclosed in brackets. Syntax format 72 is extended to include additional optional parameters that allow an administrator to check connectivity of particular unnumbered interfaces of source and target devices, and also to learn the route that packets take from the source device to target device. The traceroute protocol operates by allowing server 12A to manipulate the TTL value of a series of ICMP echo request packets to force each hop along the path to the destination to return an error message to server 12A.

As illustrated in command line interface 70, syntax format 72 includes option "-d", which allows administrator 16 to require that addresses are not resolved to hostnames. Optional field "-h" allows administrator 16 to define the maximum number of hops used to searched for the destination. Optional field "-j" allows administrator 16 to require a loose source route along the host-list. Optional field "-w" allows administrator 16 to configure the timeout in milliseconds to wait for each reply.

Similar to the extended ping protocol, for each of these optional fields, administrator 16 may specify an index number or other relative identifier for unnumbered interfaces for the respective source or target device. These logical identifiers of interfaces 15B may be internal to server 12B, such as defined within configuration information for the server, and not generally known to other devices of network 14. The extended traceroute protocol communicates the indexes via fields 52, 54 of packet format 40 (FIG. 3). In this manner, administrator 16 may use the extended traceroute protocol to test for connectivity of particular interfaces of the target device even where IP addresses or other identifiers for the interfaces are not externally known.

FIG. 7 is an exemplary screen illustration depicting an example command line interface 80 as viewed on a source device, such as server 12A of FIG. 1. Command line interface 80 shows an example input 82 as entered by administrator 16, and an example output 64 generated by the extended traceroute protocol. As shown in example input 82, administrator 16 requested the traceroute protocol by entering the command "tracert." Administrator 16 customized the traceroute request using some of the optional fields described above with respect to FIG. 6. For example, administrator 16 used the command "-h 7" to define the maximum number of hops used to search for the destination (i.e., server 12B) to be 7 hops. Administrator 16 also used the command "-w 18" to define the time for waiting for each reply as 18 milliseconds.

Administrator 16 entered the name of the target device 12B into the "target_name" field, and specified logical indices (i.e., offsets) for the source and destination interfaces of interest as interfaces 1 and 3, respectively, using the src_int and dst_int fields. Again, server 12A and server 12B internally resolve the indices to interface 15A-1 and interface 15A-3, respectively, possibly using internal configuration data. In this manner, administrator 16 may require that the echo request packets sent by server 12A are output over interface 1 of server 12A, and that any echo reply packets sent by server 12B are output over interface 3 of server 12B. This way, administrator 16 may test the identified unnumbered interfaces for connectivity. Depending on the number of potential routes between the source and target devices, the administrator may be able to use the extended traceroute protocol to test for problems along a particular route by selectively choosing the interfaces of the source and target devices.

Command line interface 80 also shows output 84 generated by traceroute module 36B (FIG. 2). Traceroute module 36B traced the route to server 12B over a maximum of 7 hops. Traceroute module 36B generated a reply line for each of the seven echo request packets that traceroute module 36B sent. The reply lines state the IP address of the router that the reply packet was sent from, the index of the interface the request packet entered (IN) and the index of the interface the reply packet exited (OUT) for each hop. When traceroute module 36B encounters a router that does not respond, traceroute module 36B may print a "*" character. It is possible that the maximum number of hops defined by administrator 16 will be too few hops to allow the entire route to server 12B to be traced. In some embodiments, the reply lines generated by traceroute module 36B may indicate the interface the request packet entered, but not the interface the reply packet exited. However, the interface the reply packet exited may be inferred based on the interfaces the request packets entered.

Figure 8:
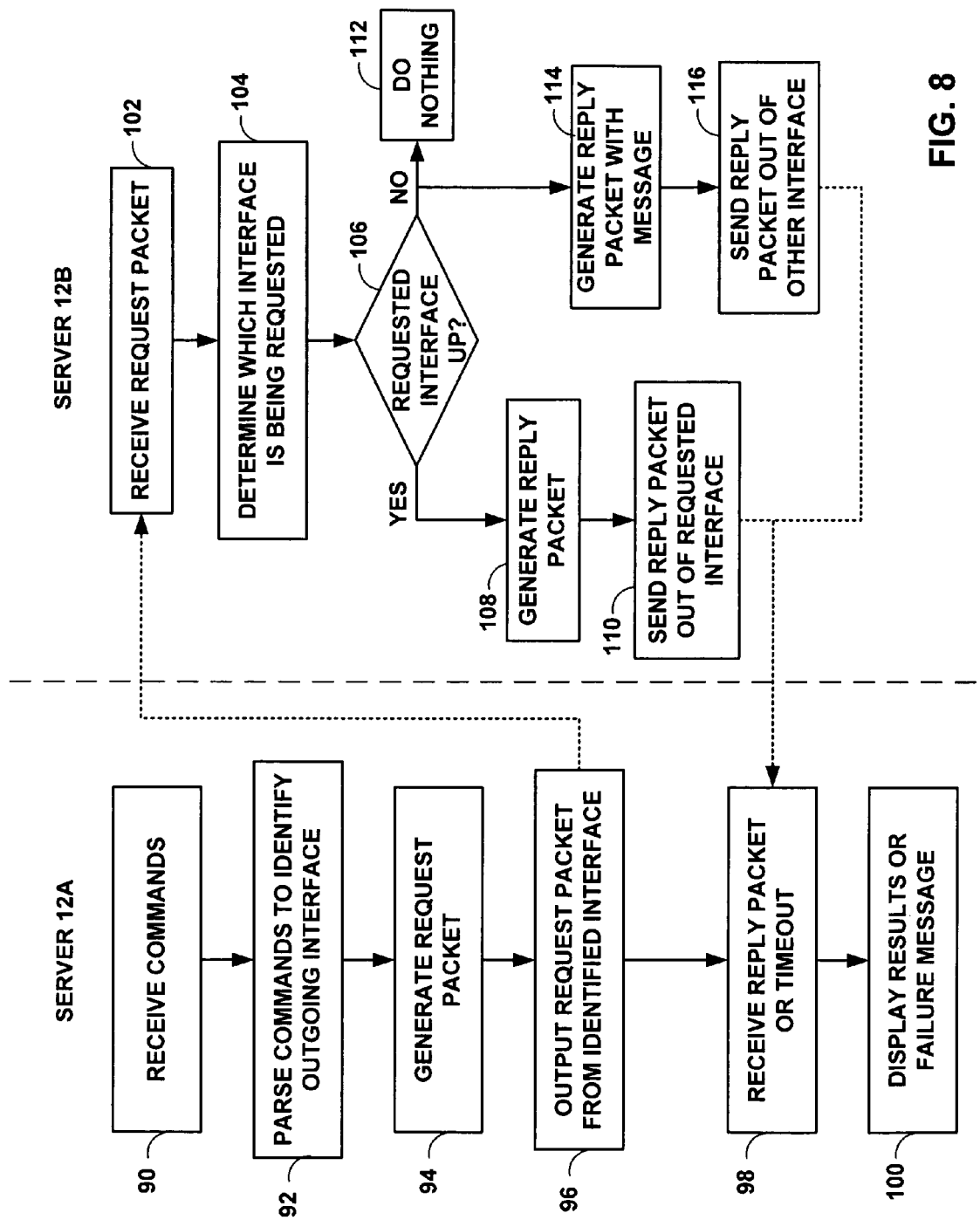
FIG. 8 is a flowchart illustrating exemplary operation of a computer network in testing connectivity of unnumbered interfaces using a ping protocol that has been extended consistent with the principles of the invention.

FIG. 8 is a flowchart illustrating exemplary operation of network environment 10 in testing connectivity of unnumbered interfaces using an extended ping protocol. For exemplary purposes, FIG. 8 is explained with reference to servers 12 of FIG. 1.

Initially, server 12A receives commands entered by a user, such as administrator 16 (90) to invoke the ping diagnostic protocol. Administrator 16 may enter commands via a user interface on server 12A. In particular, administrator 16 may enter commands via a command line interface, such as those illustrated in FIGS. 4-7. Administrator 16 may enter commands to test connectivity of particular unnumbered interfaces of servers 12 using the ping protocol. The commands may include an index number of an unnumbered interface of server 12B to be tested, and also may include an index number of an unnumbered interface of server 12A to be tested. Alternatively, administrator 16 may utilize the extended ping protocol in a conventional manner.

Server 12A parses the commands received from administrator 16 to identify whether administrator 16 has specified a particular unnumbered interface of server 12A (i.e., a source unnumbered interface) for testing (92), i.e., to determine from which interface of server 12A to output the request packets. For example, administrator 16 may enter an offset of "1" to specify a corresponding unnumbered interface of server 12A, i.e., interface 15A-1 of server 12A.

Server 12A resolves the specified offset to an unnumbered source interface, possibly using internal configuration information, and generates a request packet (94), such as packet 40 of FIG. 3. The request packet may be an ICMP packet, such as an extended ping echo request packet that is extended to include additional fields. For example, the request packet may include fields for the destination interface and source interface to be tested. Server 12A outputs the request packet from the identified source interface, in this example interface 15A-1, based on the information in the source interface field of the request packet (96).

Server 12A may receive a reply packet from server 12B (98), and display results or statistics about the reply packet on the command line interface (100). In some cases, server 12A may not receive a reply packet from server 12B before a timeout period expires (98). In this situation, server 12A may display a failure message on the command line interface (100). In cases where server 12A is unable to output the request packet from interface 15A-1 due to interface 15A-1 being down, server 12A may skip directly to step 100 and display a failure message that indicates that interface 15A-1 was down and no packets were sent. Alternatively, in this situation server 12A may output the request packet from a different interface of server 12A, to nonetheless attempt to test the selected interface of server 12B for connectivity.

In either case, after server 12A has sent a request packet, server 12B may receive the request packet (102). Upon receiving the request packet, server 12B may examine destination interface field 54 (FIG. 3) of the request packet to determine which interface of server 12B, if any, has been designated for testing (104). As shown in the example of FIG. 5, administrator 16 may have specified a logical offset of "3" to implicitly indicate to server 12B that interface 15B-3 is to be tested. If interface 15B-3 is up (YES branch of 106), server 12B may generate a reply packet (108). The reply packet may be an ICMP packet as shown in FIG. 3, such as an echo reply packet that is extended to include additional fields. When server 12B generates the echo reply packet, server 12B may swap the source and destination IP addresses in the IP header 42 and replace the "8" in the ICMP Type Field 44 with a "0" (for Echo Reply), add any optional data from variable user data field 50, and recalculate all the checksums for field 48.

Server 12B then sends the echo reply packet to server 12A via the requested interface 15B-3 (110). Provided intermediate connectivity exists, server 12A receives the reply packet (98), and displays results about the reply packet (100). In the case where interface 15B-3 is up but intermediate connectivity does not exist, server 12A will not receive the reply packet (98) before a time-out period expires (98), likely causing server 12A to output a failure message (100).

In the case where the specified unnumbered destination interface (e.g., interface 15B-3) is down (NO branch of 106), server 12B may do nothing (112). In this case server 12A will not receive a reply packet before a time-out period expires (98), and will likely output a failure message (100).

Alternatively, server 12B may generate a reply packet with a message indicating that interface 15B-3 is down (114), and may send the reply packet out of another interface of server 12B that is not down (116). Server 12A may receive the reply packet (98) and display a failure message (100). Server 12A may display an indication of success when a reply packet is received from server 12B with no indication of failure, display an indication of failure when a reply packet is received from server 12B indicating failure, or display an indication of connectivity failure when a reply packet is not received from server 12B.

Figure 9:
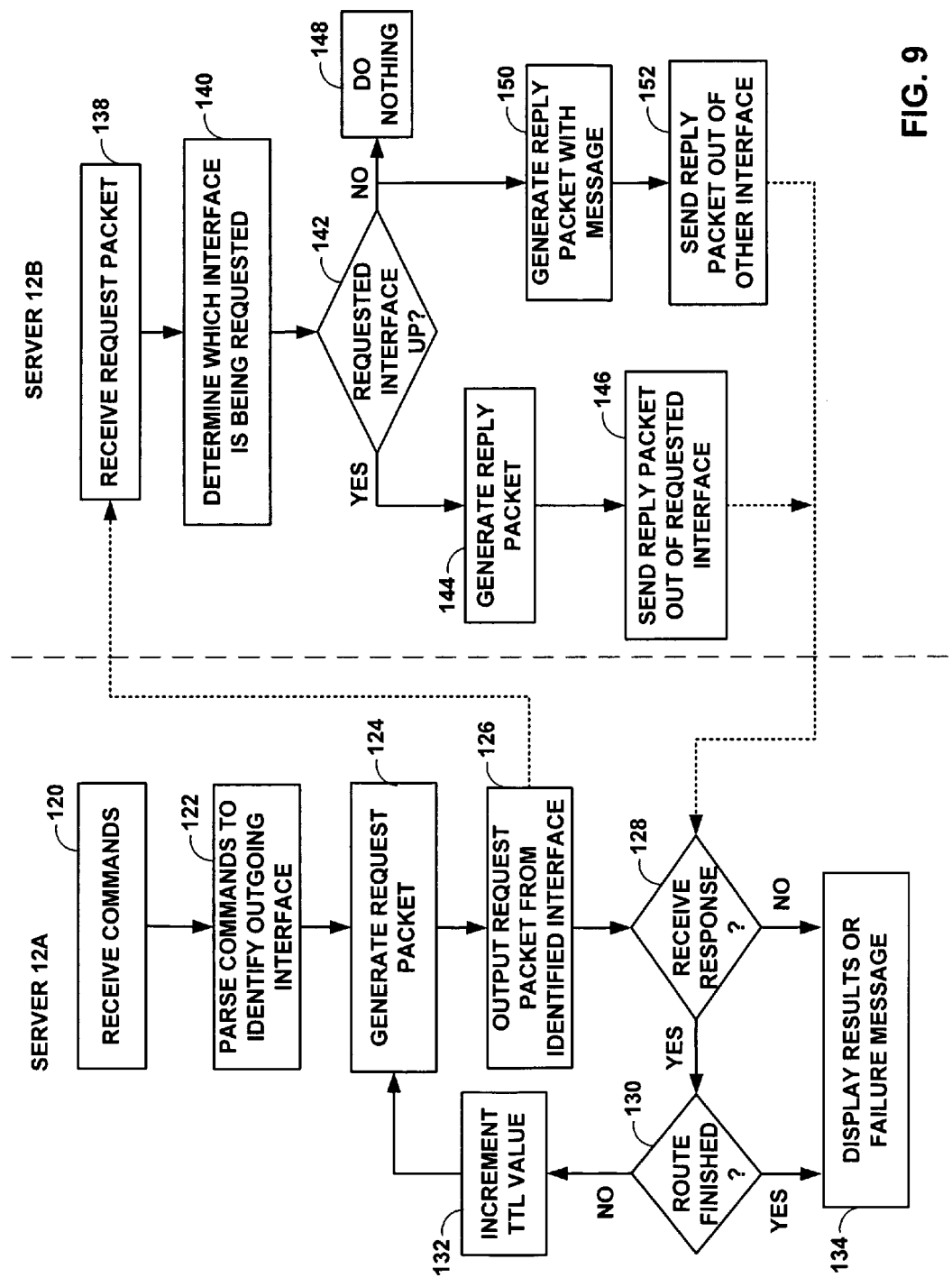
FIG. 9 is a flowchart illustrating exemplary operation of a computer network in testing connectivity of unnumbered interfaces using a traceroute protocol that has been extended consistent with the principles of the invention.

FIG. 9 is a flowchart illustrating exemplary operation of a network 14 in testing connectivity of unnumbered interfaces using a traceroute protocol that has been extended consistent with the principles of the invention. Initially, server 12A receives commands entered by a user, such as administrator 16 (120) to invoke the traceroute diagnostic protocol. Administrator 16 may enter commands via a user interface on server 12A. In particular, administrator 16 may enter commands via a command line interface, such as those illustrated in FIGS. 4-7. Administrator 16 may enter commands to test connectivity along a route between particular unnumbered interfaces of servers 12 using the traceroute protocol. The commands may include an index number of an unnumbered interface of server 12B to be tested, and also may include an index number of an unnumbered interface of server 12A to be tested. Alternatively, administrator 16 may utilize the extended traceroute protocol in a conventional manner.

Server 12A parses the commands received from administrator 16 to identify whether administrator 16 has specified a particular unnumbered interface of server 12A (i.e., a source unnumbered interface) for testing (122), i.e., to determine from which interface of server 12A to output the request packet. For example, administrator 16 may enter an offset of "1" to specify a corresponding unnumbered interface of server 12A, i.e., interface 15A-1 of server 12A.

As explained above, the traceroute utility operates by allowing server 12A to manipulate the TTL value of a series of ICMP echo request packets to force each hop along the path to the destination to return an error message to server 12A. Server 12A resolves the specified offset to an unnumbered source interface, possibly using internal configuration information, and generates a request packet (124), such as packet 40 of FIG. 3, which has a TTL value of 1 hop. Using a TTL value of 1 forces the first hop along the path to server 12B to return an error message to server 12A. The request packet may be an ICMP packet, such as an extended traceroute echo request packet that is extended to include additional fields. For example, the request packet may include fields for the destination interface and source interface to be tested. Server 12A outputs the request packet from the identified source interface, in this example interface 15A-1, based on the information in the source interface field of the request packet (126).

If server 12A receives a response packet from the first hop along the path (YES branch of 128), server 12A will determine whether the route to server 12B is finished (i.e., whether the first hop is the target device 12B) (130). If the route is not finished (NO branch of 130), server 12A will increment the TTL value to 2 (132), and generate a second request packet having the incremented TTL value (124). Using a TTL value of 2 forces the second hop along the path to server 12B to return an error message to server 12A. Server 12A continues in this manner until either a response to a request packet fails to be received from a hop or the target device (NO branch of 128), or the route to server 12B is finished (YES branch of 130). Server 12A may display results or statistics on the command line interface about received reply packets (e.g., IP addresses of each hop), or may display a failure message (134).

In either case, when server 12A has sent a request packet with a TTL value that enables the packet to reach server 12B, server 12B may receive the request packet (138). Upon receiving the request packet, server 12B may examine destination interface field 54 (FIG. 3) of the request packet to determine which interface of server 12B, if any, has been designated for testing (140). As shown in the example of FIG. 7, administrator 16 may have specified a logical offset of "3" to implicitly indicate to server 12B that interface 15B-3 is to be tested. If interface 15B-3 is up (YES branch of 142), server 12B may generate a reply packet (144). The reply packet may be an ICMP packet as shown in FIG. 3, such as an echo reply packet that is extended to include additional fields. When server 12B generates the echo reply packet, server 12B may swap the source and destination IP addresses in the IP header 42 and replace the "8" in the ICMP Type Field 44 with a "0" (for Echo Reply), add any optional data from variable user data field 50, and recalculate all the checksums for field 48.

Server 12B then sends the echo reply packet to server 12A via the requested interface 15B-3 (146). Provided intermediate connectivity exists, server 12A receives the reply packet (128), determines that the route is finished (130) and displays results about the reply packet (134). In the case where interface 15B-3 is up but intermediate connectivity does not exist, server 12A will not receive the reply packet before a time-out period expires (128), likely causing server 12A to output a failure message (134).

In the case where the specified unnumbered destination interface (e.g., interface 15B-3) is down (NO branch of 142), server 12B may do nothing (148). In this case server 12A will not receive a reply packet before a time-out period expires (128), and will likely output a failure message (134).

Alternatively, server 12B may generate a reply packet with a message indicating that interface 15B-3 is down (150), and may send the reply packet out of another interface of server 12B that is not down (152). Server 12A may receive the reply packet (128), determine that the route is finished (130), and display a failure message (134). Server 12A may display an indication of success when a reply packet is received from server 12B with no indication of failure, display an indication of failure when a reply packet is received from server 12B indicating failure, or display an indication of connectivity failure when a reply packet is not received from server 12B.

Various embodiments of the invention have been described. These and other embodiments are within the scope of the following claims.

The invention claimed is:

1. A method for testing connectivity of unnumbered interfaces of a target device, the method comprising:
    executing a software utility on a source device;
    presenting with the software utility a user interface to receive input from a user at the source device, wherein the input identifies the target device and an offset, wherein the offset represents an index internally resolved by the target device to one of a plurality of unnumbered network interfaces of the target device and the offset controls the one of the plurality of unnumbered network interfaces from which the target device will output a reply packet, wherein each of the unnumbered network interfaces of the target device is coupled to a different network link, and wherein the plurality of unnumbered network interfaces of the target device have no publicly known identifiers that are known by devices external to the target device; and
    outputting from the source device with the software utility one or more request packets to test connectivity from the source device to one of the plurality of unnumbered network interfaces of the target device,
    wherein at least one of the request packets specifies the offset and communicates the offset from the source device to the target device to request a connectivity test of the one of the plurality of unnumbered network interfaces of the target device represented by the identified offset.

2. The method of claim 1, further comprising:
    presenting the user interface to receive a second offset from the user, wherein the second offset represents an index into one of a plurality of unnumbered network interfaces of the source device, wherein each of the unnumbered network interfaces of the source device is coupled to a different network link;
    resolving the second offset to one of the plurality of unnumbered network interfaces of the source device to select a source unnumbered network interface; and
    outputting with the software utility the one or more request packets from the selected source unnumbered network interface to test connectivity from the source unnumbered network interface to the target device.

3. The method of claim 2, wherein outputting with the software utility the one or more request packets comprises:
    generating a request packet that includes a first field specifying the offset representing an index into the plurality of unnumbered network interfaces of the target device, and a second field specifying the second offset representing an index into the plurality of unnumbered network interfaces of the source device; and
    outputting the request packet from the selected source unnumbered network interface of the source device to the target device when a connectivity status of the selected source unnumbered network interface indicates the selected source unnumbered network interface is operable.

4. The method of claim 3, when the connectivity status indicates the selected source unnumbered network interface is not operable, the method further comprising:

outputting the request packet from a user interface of the source device other than the selected source unnumbered network interface; and displaying a message indicating that the selected source unnumbered network interface is not operable.

5. The method of claim 1, outputting at least one request packet that specifies a different offset and communicates the different offset from the source device to the target device to request a connectivity test of the one of the plurality of unnumbered network interfaces of the target device represented by the different identified offset.

6. The method of claim 5, further comprising:

receiving a first reply packet output from a first unnumbered network interface of the target device in response to the request packet specifying the offset; and receiving a second reply packet output from a second unnumbered network interface of the target device in response to the request packet specifying the different offset.

7. The method of claim 1, further comprising:

receiving the one or more request packets at the target device;

resolving the offset to one of the plurality of unnumbered network interfaces of the target device to select a target unnumbered network interface for which the connectivity test is requested; and outputting to the source device a reply packet from the selected target unnumbered network interface of the target device to test connectivity between the target unnumbered network interface and the source device.

8. The method of claim 1, wherein executing a software utility comprises executing one of a ping utility or a traceroute utility that has been extended to receive the offset from the user and send the offset to the destination device using a modified Internet Control Message Protocol (ICMP) echo request packet.

9. The method of claim 1, wherein presenting with the software utility a user interface comprises presenting the user interface to include an optional field for the user to enter the offset.

10. The method of claim 1, further comprising:

displaying an indication of success when a reply packet is received from the target device with no indication of failure;

displaying an indication of failure when a reply packet is received from the target device indicating failure; and displaying an indication of connectivity failure when a reply packet is not received from the target device.

11. A method for testing connectivity of unnumbered interfaces of a target device comprising:

receiving from a source device a request packet to initiate a connectivity test at the target device, wherein the request packet includes a field specifying an offset, wherein the offset represents an index into one of a plurality of unnumbered network interfaces of the target device and the offset controls the one of the plurality of unnumbered network interfaces from which the target device will output a reply packet, wherein each of the unnumbered network interfaces of the target device is coupled to a different network link, and wherein the plurality of unnumbered network interfaces of the target device have no publicly known identifiers that are known by devices external to the target device;

internally resolving, with the target device, the offset to one of the plurality of unnumbered network interfaces of the target device to select a target unnumbered network interface for which the connectivity test is requested; and outputting to the source device a reply packet from the selected target unnumbered network interface of the target device to test connectivity from the target unnumbered network interface to the source device.

12. The method of claim 11, wherein outputting to the source device a reply packet further comprises outputting the reply packet from the selected target unnumbered network interface of the target device when a connectivity status indicates the selected target unnumbered network interface is operable.

13. The method of claim 11, wherein outputting to the source device a reply packet further comprises outputting the reply packet from an interface other than the selected target unnumbered network interface when a connectivity status indicates the selected target unnumbered network interface is not operable, wherein the reply packet contains a message indicating that the selected target unnumbered network interface corresponding to the offset is not operable.

14. A source network device for testing connectivity of unnumbered interfaces of a target device, the source network device comprising:

an interface card;

a software utility executing on the source network device that presents a user interface to receive input from a user, wherein the input identifies the target device and an offset that represents an index internally resolved by the target device to one of a plurality of unnumbered network interfaces of the target device and the offset controls the one of the plurality of unnumbered network interfaces from which the target device will output a reply packet, wherein each of the unnumbered network interfaces of the target device is coupled to a different network link, wherein the plurality of unnumbered network interfaces of the target device have no publicly known identifiers that are known by devices external to the target device, and wherein the software utility outputs from the source network device one or more packets via the interface card to test connectivity from the source network device to one of the plurality of unnumbered network interfaces of the target device represented by the identified offset, and wherein at least one of the request packets specifies the offset and communicates the offset from the source device to the target device to request a connectivity test of the one of the plurality of unnumbered network interfaces of the target device represented by the identified offset.

15. The source network device of claim 14, wherein the software utility comprises one of a ping utility and a traceroute utility that has been extended to receive the offset from the user and send the offset to the destination device using a modified Internet Control Message Protocol (ICMP) echo request packet.

16. The source network device of claim 14, wherein the software utility presents a user interface that includes an optional field for the user to enter the offset.

17. The source network device of claim 14, wherein the software utility presents the user interface to receive a second offset from the user, wherein the second offset represents an index into one of a plurality of unnumbered network interfaces of the interface card of the source network device, wherein each of the unnumbered network interfaces of the target device is coupled to a different network link, wherein the software utility resolves the second offset to one of the plurality of unnumbered network interfaces of the source network device to select a source unnumbered network interface, and wherein the software utility outputs one or more packets from the selected source unnumbered network interface to test connectivity from the source unnumbered network interface to the target device.

18. A system for testing connectivity of unnumbered interfaces of a target device, the system comprising:

a source device that outputs a request packet to initiate a connectivity test at a target device, wherein the request packet includes a field specifying an offset, and wherein the offset represents an index internally resolved by the target device to one of a plurality of unnumbered network interfaces of the target device and the offset controls the one of the plurality of unnumbered network interfaces from which the target device will output a reply packet, wherein each of the unnumbered network interfaces of the target device is coupled to a different network link, and wherein the plurality of unnumbered network interfaces of the target device have no publicly known identifiers that are known by devices external to the target device; and a target device that resolves the offset to one of the plurality of unnumbered network interfaces of the target device to select a target unnumbered network interface for which the connectivity test is requested, wherein the target device outputs to the source device a reply packet from the selected target unnumbered network interface of the target device to test connectivity between the target unnumbered network interface represented by the specified offset and the source device.

19. The system of claim 18, wherein the source device provides an operating environment for a software utility that presents a user interface to receive input identifying the target device and specifying the offset, and wherein the software utility outputs the request packet using a modified Internet Control Message Protocol (ICMP) echo request packet.

20. A non-transitory computer-readable storage medium for testing connectivity of unnumbered interfaces of a target device, the computer-readable storage medium comprising instructions stored thereon for causing a programmable processor to:

execute a software utility on a source device;

present with the software utility a user interface to receive input from a user at the source device, wherein the input identifies a target device and an offset, wherein the offset represents an index internally resolved by the target device to one of a plurality of unnumbered network interfaces of the target device and the offset controls the one of the plurality of unnumbered network interfaces from which the target device will output a reply packet, wherein each of the unnumbered network interfaces of the target device is coupled to a different network link, and wherein the plurality of unnumbered network interfaces of the target device have no publicly known identifiers that are known by devices external to the target device; and output from the source device with the software utility one or more request packets to test connectivity from the source device to one of the plurality of unnumbered network interfaces of the target device, wherein at least one of the packets specifies the offset and communicates the offset from the source device to the target device to request a connectivity test of the one of the plurality of unnumbered network interfaces of the target device represented by the identified offset.

\* \* \* \* \*